(12) United States Patent
Morita

(10) Patent No.: US 8,144,649 B2
(45) Date of Patent: Mar. 27, 2012

(54) COMMUNICATION CONTROL APPARATUS, WIRELESS COMMUNICATION APPARATUS, COMMUNICATION CONTROL METHOD, AND WIRELESS COMMUNICATION METHOD

(75) Inventor: Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 332 days.

(21) Appl. No.: 12/513,050

(22) PCT Filed: Oct. 26, 2007

(86) PCT No.: PCT/JP2007/070913
§ 371 (c)(1),
(2), (4) Date: Apr. 30, 2009

(87) PCT Pub. No.: WO2008/053804
PCT Pub. Date: May 8, 2008

(65) Prior Publication Data
US 2010/0067414 A1   Mar. 18, 2010

(30) Foreign Application Priority Data
Oct. 30, 2006  (JP) ................................ 2006-294812

(51) Int. Cl.
*H04W 4/00*   (2009.01)

(52) U.S. Cl. ..................................... 370/328

(58) Field of Classification Search .................. None
See application file for complete search history.

(56) References Cited

U.S. PATENT DOCUMENTS

| 2003/0174733 A1 | 9/2003 | Kawai et al. .................. 370/498 |
| 2004/0037297 A1 | 2/2004 | Ishida et al. ............. 370/395.54 |
| 2010/0172253 A1* | 7/2010 | Morita .......................... 370/252 |

FOREIGN PATENT DOCUMENTS

| JP | 2003-273916 | 9/2003 |
| JP | 2004-080543 | 3/2004 |
| JP | 2007-306206 | 11/2007 |
| WO | WO 2007/114193 A1 | 10/2007 |

OTHER PUBLICATIONS

Chinese language office action dated Jun. 15, 2011 and its English language translation for corresponding Chinese application 200780040403.7.

* cited by examiner

*Primary Examiner* — Anh-Vu Ly
(74) *Attorney, Agent, or Firm* — DLA Piper LLP (US)

(57) ABSTRACT

In order to send a sender side a transmission band control Msg indicating that a band has become narrow consistently with the minimum arrival time when performing communication while compensating for insufficient band of one wireless communication path with another wireless communication path, a communication control apparatus 100 and a wireless communication apparatus 300 are provided with transmission band control information generating units (109, 309) for generating transmission band control information indicating that a transmission band has become narrow based on the packets received through one wireless communication path 10A, transmission band control information generating units (109, 309) for generating transmission band control information indicating that a transmission band has become narrow based on the packets received through another wireless communication path 10B, and transmission band control information transmission path control units (115, 315) for selecting the most suitable transmission path for sending generated transmission band control information based on the band statuses of a plurality of wireless communication paths.

12 Claims, 7 Drawing Sheets

COMMUNICATION CONTROL APPARATUS, WIRELESS COMMUNICATION APPARATUS, COMMUNICATION CONTROL METHOD, AND WIRELESS COMMUNICATION METHOD

CROSS REFERENCE TO RELATED APPLICATION

This application is a national stage of international application No. PCT/JP2007/070913, filed on Oct. 26, 2007, and claims priority to and the benefit of Japanese Patent Application No. 2006-294812 filed Oct. 30, 2006, the entire contents of which are incorporated herein by reference.

TECHNICAL FIELD

The present invention relates to a novel communication control apparatus, wireless communication apparatus, communication control method and wireless communication method capable of using a plurality of different wireless communication paths and performing communication by compensating for insufficient band of one wireless communication path with respect to a band required by a real-time application in use with another wireless communication path.

BACKGROUND ART

For example, in a wireless communication network employing an Internet protocol (IP) group (hereinafter occasionally referred to as "wireless IP network"), so-called mobile IP is defined in order to improve the mobility of wireless communication apparatus (e.g. non-patent literature 1).

Mobile IP uses a care-of IP address (Care of Address) that is dynamically allocated according to the location of wireless communication apparatus. Non-patent literature 1: C. Perkins, "IP Mobility Support (RFC2002)", [online], October 1996, IETF, [searched on Mar. 15, 2006], downloaded from the web site of the Internet Engineering Task Force.

SUMMARY OF INVENTION

Technical Problem

In these days, an environment where a wireless communication apparatus can use a plurality of wireless IP networks (e.g. a cellular phone network and a wireless LAN network) is gradually being provided.

If such an environment is provided, it is possible to use a plurality of wireless IP networks simultaneously such that when the band of the wireless IP network used for communication being performed is insufficient, the insufficient band is compensated with another wireless IP network.

However, assuming that one wireless IP network is a master path and another wireless IP network is a slave path and when the band that is insufficient in the master path is compensated with the slave path, if the allowable band of the slave path is not sufficient with respect to the band that requires compensation, the packets to be sent to the slave path for the band compensation are temporarily accumulated in buffers that exist on the path because the band is insufficient, and then sequentially sent out. Therefore, on a receiver side, a delay occurs between the packet received through the master path and that received through the slave path. This delay appears as an overtaking of SN (sequence number) in the case of VoIP packets.

In a real-time application such as VoIP, a jitter-buffer is provided to absorb overtaking of packet in a network. However, when a delay between paths becomes larger and exceeds the buffer capacity of the jitter-buffer, the packets that are delayed and exceeding the capacity are discarded even if they are received. Therefore, if sending of packets exceeding the allowable band is continued, the amount of packets to be accumulated in the buffers that exist on the path increases (up to the limit capacity of the buffer) and causes a delay difference according to the accumulated amount. Then finally, all of the packets sent for compensation are discarded on a receiver side.

Particularly, in a wireless communication path, since an allowable band is dependent on a change in a propagation environment such as fading, even if an allowable band of a slave path is sufficient at the beginning of communication start, the band becomes narrow due to deterioration of the propagation environment, which facilitates occurrence of the above mentioned phenomenon. To avoid this, for example, it is possible to accurately detect fluctuations of the allowable band of the slave path, specifically detect if the band has become narrow, based on the packets received in the slave path. Then when it is detected that the band has become narrow, a transmission band control message (hereinafter occasionally abbreviated as Msg) indicating so is sent to a packet sender side. Thus compensation exceeding the allowable band can be avoided.

Since such fluctuation of allowable band occurs also on a master path side, on the master path side, in the same manner, it is possible to detect the narrowing of the master path based on the received packets as well, and send a transmission band control Msg indicating that the band has become narrow to a packet sender side. Thus sending of packets exceeding the allowable band can be avoided.

However, in this case, when a transmission band control Msg is sent to a packet sender side from a wireless communication path to be controlled whose band has become narrow, arrival of the transmission band control Msg itself to the packet sender side is delayed. Because of this, retention in a packet transmission path increases by the amount of delay, that is, a delay time increases. Therefore more time is required to solve the retention.

In addition, it is possible to send a transmission band control Msg to a packet sender side from another wireless communication path that is different from the wireless communication path to be controlled. However, also in this case, the same problem occurs if the allowable band of the another wireless communication path has become narrow.

Therefore, it is an object of the present invention in view of such circumstances to provide a communication control apparatus, a wireless communication apparatus, a communication control method and a wireless communication method capable of using a plurality of different wireless communication paths, and when performing communication while compensating for insufficient band of one wireless communication path with another wireless communication path, capable of sending a packet sender side a transmission band control Msg indicating that a transmission band has become narrow consistently with the minimum arrival time and minimizing packet retention in the wireless communication path.

Solution to Problem

According to a first aspect of the present invention to achieve the above object, a communication control apparatus capable of using a plurality of different wireless communication paths for a wireless communication apparatus and controlling communication between the wireless communication apparatus and a corresponding party by compensating for insufficient band of one wireless communication path with respect to a band required by a real-time application in use with another wireless communication path, comprising:

a first upward transmission band control information generating unit for generating first upward transmission band control information indicating that a transmission band of packet to be sent by the wireless communication apparatus to the one wireless communication path has become narrow based on packet received through the one wireless communication path;

a second upward transmission band control information generating unit for generating second upward transmission band control information indicating that a transmission band of packet to be sent by the wireless communication apparatus to the another wireless communication path has become narrow based on packet received through the another wireless communication path; and an upward transmission band control information transmission path control unit for selecting a most suitable transmission path for sending the first upward transmission band control information or the second upward transmission band control information to the wireless communication apparatus based on band statuses of the plurality of wireless communication paths.

According to a second aspect of the present invention, in the communication control apparatus according to the first aspect, the upward transmission band control information transmission path control unit selects, from the one wireless communication path and the another wireless communication path, a wireless communication path that has not sent the first or second upward transmission band control information for a certain period of time as the most suitable transmission path.

According to a third aspect of the present invention, in the communication control apparatus according to the first aspect, the upward transmission band control information transmission path control unit selects, from the one wireless communication path and the another wireless communication path, a wireless communication path that has the largest allowable band as the most suitable transmission path for the first or second upward transmission band control information.

According to a fourth aspect of the present invention, in the communication control apparatus according to the second aspect, the upward transmission band control information transmission path control unit selects, from the one wireless communication path and the another wireless communication path, a wireless communication path that has the largest allowable band as the most suitable transmission path for the first or second upward transmission band control information.

According to a fifth aspect of the present invention, in the communication control apparatus according to the first aspect, the upward transmission band control information transmission path control unit selects, from the one wireless communication path and the another wireless communication path, a wireless communication path that requires the shortest retention solving time of packet sent from the wireless communication apparatus as the most suitable transmission path for the first or second upward transmission band control information.

Further, according to a sixth aspect of the present invention to achieve the above object, a wireless communication apparatus capable of using a plurality of different wireless communication paths for a communication control apparatus and performing wireless communication with a corresponding party through the communication control apparatus by compensating for insufficient band of one wireless communication path with respect to a band required by a real-time application in use with another wireless communication path, comprises:

a first downward transmission band control information generating unit for generating first downward transmission band control information indicating that a transmission band of packet to be sent by the communication control apparatus to the one wireless communication path has become narrow based on packet received through the one wireless communication path;

a second downward transmission band control information generating unit for generating second downward transmission band control information indicating that a transmission band of packet to be sent by the communication control apparatus to the another wireless communication path has become narrow based on packet received through the another wireless communication path; and a downward transmission band control information transmission path control unit for selecting a most suitable transmission path for sending the first downward transmission band control information or the second downward transmission band control information to the communication control apparatus based on band statuses of the plurality of wireless communication paths.

According to a seventh aspect of the present invention, in the wireless communication apparatus according to the sixth aspect, the downward transmission band control information transmission path control unit selects, from the one wireless communication path and the another wireless communication path, a wireless communication path that has not sent the first or second downward transmission band control information for a certain period of time as the most suitable transmission path.

According to an eighth aspect of the present invention, in the wireless communication apparatus according to the sixth aspect, the downward transmission band control information transmission path control unit selects, from the one wireless communication path and the another wireless communication path, a wireless communication path that has the largest allowable band as the most suitable transmission path for the first or second downward transmission band control information.

According to a ninth aspect of the present invention, in the wireless communication apparatus according to the seventh aspect, the downward transmission band control information transmission path control unit selects from the one wireless communication path and the another wireless communication path, a wireless communication path that has the largest allowable band as the most suitable transmission path for the first or second downward transmission band control information.

According to a tenth aspect of the present invention, in the wireless communication apparatus according to the sixth aspect, the downward transmission band control information transmission path control unit selects, from the one wireless communication path and the another wireless communication path, a wireless communication path that requires the shortest retention solving time of packet sent from the communication control apparatus as the most suitable transmission path for the first or second downward transmission band control information.

Further, according to an eleventh aspect of the present invention to achieve the above object, a communication control method capable of using a plurality of different wireless communication paths for a wireless communication apparatus and controlling communication between the wireless communication apparatus and a corresponding party by compensating for insufficient band of one wireless communication path with respect to a band required by a real-time application in use with another wireless communication path, comprising the steps of:

generating first upward transmission band control information indicating that a transmission band of packet to be sent by the wireless communication apparatus to the one wireless communication path has become narrow based on packet received through the one wireless communication path;

generating second upward transmission band control information indicating that a transmission band of packet to be sent by the wireless communication apparatus to the another wireless communication path has become narrow based on packet received through the another wireless communication path; and selecting a most suitable transmission path for sending the first or second upward transmission band control information to the wireless communication apparatus based on band statuses of the plurality of wireless communication paths.

Further, according to a twelfth aspect of the present invention to achieve the above object, a wireless communication method capable of using a plurality of different wireless communication paths with a communication control apparatus and performing wireless communication for a corresponding party through the communication control apparatus by compensating for insufficient band of one wireless communication path with respect to a band required by a real-time application in use with another wireless communication path, comprising the steps of:

generating first downward transmission band control information indicating that a transmission band of packet to be sent by the communication control apparatus to the one wireless communication path has become narrow based on packet received through the one wireless communication path;

generating second downward transmission band control information indicating that a transmission band of packet to be sent by the communication control apparatus to the another wireless communication path has become narrow based on packet received through the another wireless communication path; and selecting a most suitable transmission path for sending the first or second downward transmission band control information to the communication control apparatus based on band statuses of the plurality of wireless communication paths.

Advantageous Effects on Invention

According to the present invention, when communication is performed by compensating for insufficient band of one wireless communication path with another wireless communication path by using a plurality of different wireless communication paths simultaneously, the most suitable transmission path for sending a packet sender side a transmission band control Msg indicating that a transmission band has become narrow is selected based on the band statuses of the plurality of wireless communication paths. Thus, it is possible to provide a communication control apparatus, a wireless communication apparatus, a communication control method and a wireless communication method capable of sending a transmission band control Msg to a packet sender side consistently with the minimum arrival time and minimizing packet retention in a wireless communication path.

DESCRIPTION OF THE NUMBERS

Figure 1:
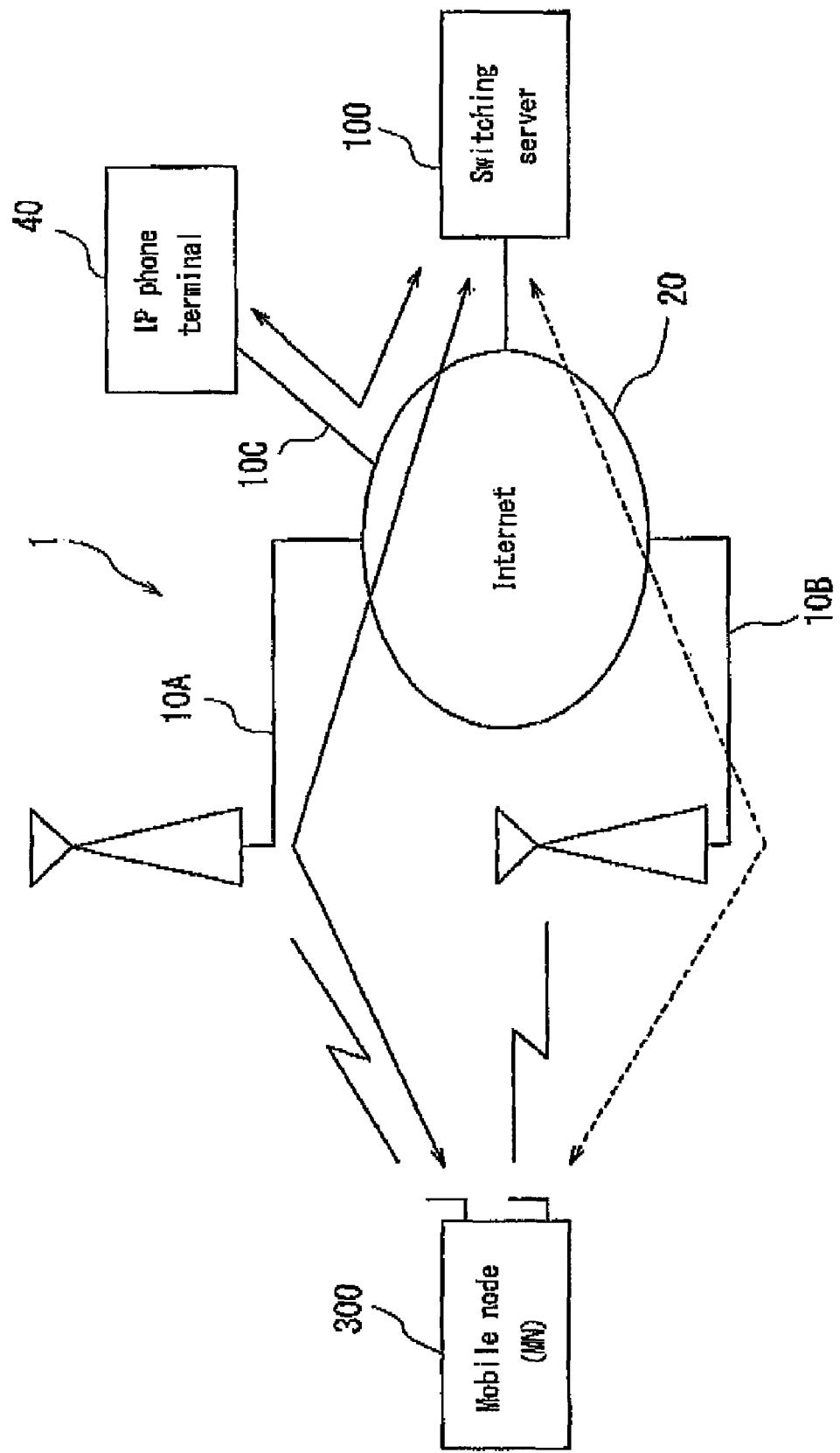
FIG. 1 is an overall schematic configuration diagram of the communication system according to the embodiment of the present invention.

1. Communication system
10A, 10B. Wireless IP network
20. Internet
40. IP phone terminal
100. Switching server
101Rx, 103Rx, 105Rx. Reception interface unit
101Tx, 103Tx, 105Tx. Transmission interface unit
107. Received packet monitoring unit
109. Transmission band calculating unit
111. Transmission band control Msg analyzing unit
113. Packet transmission path control unit
115. Control Msg transmission path control unit
117. Transmission path selecting unit
300. Mobile node (MN)
301Rx, 303Rx. Reception interface unit
301Tx, 303Tx. Transmission interface unit
305. Application processing unit
307. Received packet monitoring unit
309. Transmission band calculating unit
311. Transmission band control Msg analyzing unit
313. Packet transmission path control unit
315. Control Msg transmission path control unit
317. Transmission path selecting unit

BEST MODE FOR CARRYING OUT THE INVENTION

A preferred embodiment of the present invention will now be described with reference to the accompanying drawings.

[Overall Schematic Configuration of Communication System]

FIG. 1 is an overall schematic configuration diagram of the communication system 1 according to the embodiment of the present invention. As shown in FIG. 1, the communication system 1 includes a wireless IP network 10A and a wireless IP network 10B. The wireless IP network 10A is an IP network that can send IP packets. In the wireless IP network 10A, according to the location of a mobile node 300 (hereinafter abbreviated as MN300), which is a wireless communication apparatus, a care-of IP address A1 is dynamically allocated to the MN300. In the present embodiment, the wireless IP network 10A is a cellular phone network that employs a CDMA (specifically, it is HRPD of the 3GPP2 standard) as a wireless communication method.

The wireless IP network 10B can send IP packets in the same manner as the wireless IP network 10A. In the wireless IP network 10B, a care-of IP address A2 is allocated to the MN300. In the present embodiment, the wireless IP network 10B employs a mobile WiMAX that complies with the IEEE802.16β standard as a wireless communication method.

In addition, a care-of IP address A1 is given by the wireless IP network 10A when the MN300 is connected to the wireless IP network 10A. In the same manner, a care-of IP address A2 is given by the wireless IP network 1013 when the MN300 is connected to the wireless IP network 10B.

Further, in the present embodiment, a care-of IP address A1 and a care-of IP address A2 are associated with a home IP address AH (virtual address).

The switching server 100 and the MN300 can perform communication by using the wireless IP networks 10A and 10B simultaneously. More specifically, the switching server 100 and the MN300 send and receive IP packets by using the wireless IP network 10A as a master path. Then, when the band (transfer rate) of the master path is insufficient, the insufficient band is compensated with a slave path by using the wireless IP network 10B as the slave path. It should be noted that the slave path is not limited to the wireless IP network 10B, but there are some cases where a plurality of available wireless IP networks are used simultaneously.

The wireless IP networks 10A and 10B are connected to the Internet 20. Then the switching server 100 is connected to the Internet 20. The switching server 100 constitutes a communication control apparatus for controlling a wireless communication path to the MN300, and can send IP packets to the MN300 through the wireless IP network 10A, and send IP packets to the MN300 through the wireless IP network 10B as well.

The switching server 100 has a VPN router function that performs a routing processing of IP packets. Virtualization of the third layer of OSI is realized by establishing a tunnel using VPN (IPSec) between the MN300 and the switching server 100. Thus IP mobility of the MN300 is secured.

In other words, in the present embodiment, different from the mobile IP (e.g. RFC2002), the MN300 can perform communication with the corresponding party (specifically, an IP phone terminal 40) by using simultaneously both wireless communication paths, that is, a master path set through the wireless IP network 10A and a slave path set through the wireless IP network 10B.

The switching server 100 is connected to the IP phone terminal 40 through a communication network 10C that is connected to the Internet 20. The IP phone terminal 40 mutually exchanges voice signals and VoIP packets and sends and receives IP packets.

More specifically, the switching server 100 (communication control apparatus) receives the IP packets (VoIP packets) sent by the MN300 (wireless communication apparatus) to the IP phone terminal 40 (the corresponding party) at a predetermined cycle (20 ms) and relays the IP packets to the IP phone terminal 40. The switching server 100 receives the IP packets (VoIP packets) sent by the IP phone terminal 40 to the MN300 at a predetermined cycle (20 ms) and relays the IP packets to the MN300 as well.

Next, a function block configuration of the communication system 1 is described. More specifically, a function block configuration of the switching server 100 and the MN300 included in the communication system 1 is described with reference to FIG. 2. The units relating to the present invention are mainly described hereinafter. Therefore, it should be noted that the switching server 100 and the MN300 may be provided with a logic block (power source or the like) that is essential to achieve the function as the apparatus, but the logic block is not shown and not explained herein.

[Switching Server 100]

Figure 2:
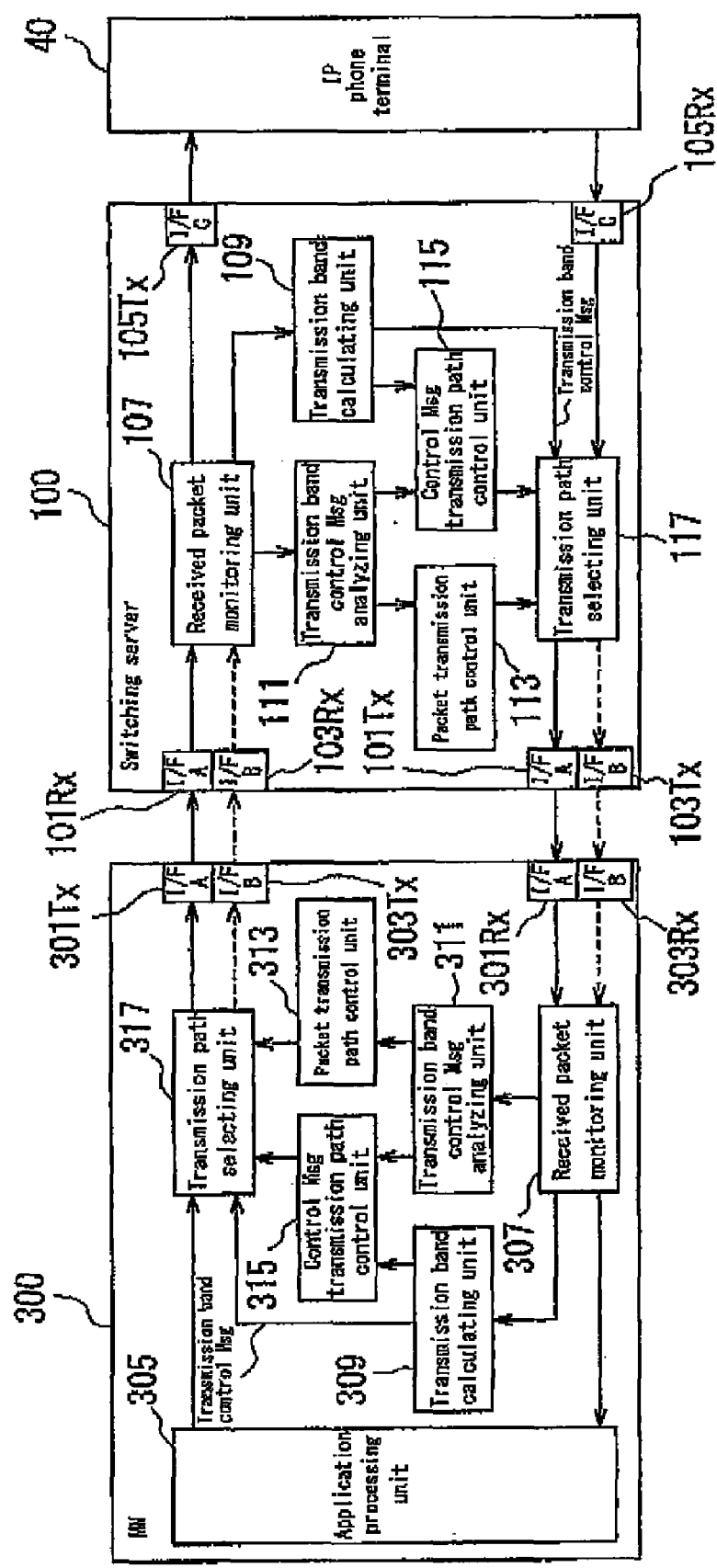
FIG. 2 is a function block diagram of the switching server and the MN shown in FIG. 1.

As shown in FIG. 2, the switching server 100 includes a reception interface unit (I/F A) 101Rx, a reception interface unit (I/F B) 103Rx, a reception interface unit (I/F C) 105Rx, a transmission interface unit (I/F A) 101Tx, a transmission interface unit (I/F B) 103Tx, a transmission interface unit (I/F C) 105Tx, a received packet monitoring unit 107, a transmission band calculating unit 109, a transmission band control Msg analyzing unit 111, a packet transmission path control unit 113, a control Msg transmission path control unit 115 and a transmission path selecting unit 117.

The reception interface unit 101Rx and the transmission interface unit 101Tx constitute a communication interface unit corresponding to the wireless IP network 10A. It is composed of, for example, a 1000BASE-T defined by the IEEE802.3ab and connected to the wireless IP network 10A through the Internet 20.

Similarly, the reception interface unit 103Rx and the transmission interface unit 103Tx constitute a communication interface unit corresponding to the wireless IP network 10B. It is composed of, for example, a 1000BASE-T defined by the IEEE802.3ab and connected to the wireless IP network 10B through the Internet 20.

In the present embodiment, VPN is set by using an IP Sec as mentioned above. IP packets sent and received by the communication interface units corresponding to these wireless IP networks 10A and 10B respectively, and more specifically, VoIP packets sent and received between the switching server 100 and the MN300 (more specifically, VoIP packets sent by the MN300) have a configuration shown in FIG. 3 (a). That is, in a VoIP packet, a home IP header (a home IP address AH), a TCP/UDP header and a payload are encapsulated, and a care-of IP address (a care-of IP address A1 or A2) is added.

In addition, access control packets sent and received between the switching server 100 and the MN300 have a configuration shown in FIG. 3(b). That is, an access control packet is composed of a data link layer header, a care-of IP address, a TCP header and a control code.

The reception interface unit 105Rx and the transmission interface unit 105Tx constitute a communication interface unit corresponding to the communication network 10C, which is connected to the Internet 20 and used for performing communication with the IP phone terminal 40.

The received packet monitoring unit 107 has a jitter-buffer for absorbing jitters of IP packets received by the reception interface units 101Rx and 103Rx, and sends the received IP packets to the IP phone terminal 40 through the transmission interface unit 105Tx. In addition, the received packet monitoring unit 107 supplies the IP packets received by the reception interface units 101Rx and 103Rx to the transmission band calculating unit 109, and supplies the first and second downward transmission band control Msgs received from the MN300 described hereinafter to the transmission band control Msg analyzing unit 111 as well.

The transmission band calculating unit 109 calculates at a predetermined cycle (e.g. 1000 ms) a first upward transmission band of the IP packets to be sent by the MN300 to the wireless IP network 10A based on the received packets from the received packet monitoring unit 107 through the wireless IP network 10A. In the case where the calculated present first upward transmission band is narrower than the first upward transmission band calculated most recently, the transmission band calculating unit 109 supplies the first upward transmission band calculated at the present time to the control Msg transmission path control unit 115, and supplies it to the transmission path selecting unit 117 as a first upward transmission band control Msg indicating that the transmission band has become narrow as well.

Further, in the same manner, the transmission band calculating unit 109 calculates at a predetermined cycle a second upward transmission band of the IP packets to be sent by the MN300 to the wireless IP network 10B based on the received packets from the received packet monitoring unit 107 through the wireless IP network 10B. In the case where the calculated present second upward transmission band is narrower than the second upward transmission band calculated most recently, the transmission band calculating unit 109 supplies the second upward transmission band calculated at the present time to the control Msg transmission path control unit 115, and supplies it to the transmission path selecting unit 117 as a second upward transmission band control Msg indicating that the transmission band has become narrow as well.

Therefore, in the present embodiment, the transmission band calculating unit 109 constitutes a first upward transmission band control information generating unit and a second upward transmission band control information generating unit.

Further, when the transmission band calculating unit 109 calculates a transmission band based on the received packets, for example, the number of packets received in a monitoring period Tchk is counted with respect to each path of the wireless IP networks 10A and 10B, then the transmission band is calculated based on the number of received packets (reception rate). In this case, the monitoring period Tchk can be fixed (e.g. 500 ms), or according to the calculated transmission band, the next monitoring period Tchk can be shortened as the transmission band becomes large.

The transmission band control Msg analyzing unit 111, based on a first downward transmission band control Msg and a second downward transmission band control Msg (described hereinafter) from the MN300 received by the received packet monitoring unit 107, analyses a first downward transmission band of the IP packets to be sent by the switching server 100 to the wireless IP network 10A and a second downward transmission band of the IP packets to be sent by the switching server 100 to the wireless IP network 10B. The transmission band control Msg analyzing unit 111 supplies the analysis results to the packet transmission path control unit 113 and the control Msg transmission path control unit 115.

The packet transmission path control unit 113 controls the transmission path selecting unit 117 based on the first and second downward transmission bands analyzed by the transmission band control Msg analyzing unit 111.

Thus, the transmission path selecting unit 117 distributes the VoIP packets from the IP phone terminal 40 received through the reception interface unit 105Rx to the transmission interface units 101Tx and 103Tx based on the first and second downward transmission bands analyzed by the transmission band control Msg analyzing unit 111, and sends them to the MN300 through the wireless IP networks 10A and 10B. Further, the transmission path selecting unit 117 comprises a jitter-buffer for absorbing jitters of IP packets received by the reception interface unit 105Rx.

More specifically, the transmission path selecting unit 117 adds a care-of IP address A1 to the IP packet that includes a home IP address AH received from the IP phone terminal 40 based on the information of the first downward transmission band received from the transmission band control Msg analyzing unit 111, and sends the IP packet having the added care-of IP address A1 from the transmission interface unit 101Tx to the wireless IP network 10A.

In addition, the transmission path selecting unit 117 adds a care-of IP address A2 to the IP packet that includes a home IP address AH received from the IP phone terminal 40 based on the information of the second downward transmission band received from the transmission band control Msg analyzing unit 111, and sends the IP packet having the added care-of IP address A2 from the transmission interface unit 103Tx to the wireless IP network 10B.

The control Msg transmission path control unit 115 controls the band statuses of the wireless IP networks 10A and 10B based on the first and second upward transmission bands supplied from the transmission band calculating unit 109 and the first and second downward transmission bands analyzed by the transmission band control Msg analyzing unit 111. Then the control Msg transmission path control unit 115 controls the transmission path selecting unit 117 based on those band statuses and selects the most suitable path for sending the MN300 the first and second upward transmission band control Msgs generated by the transmission band calculating unit 109. In addition, the first and second upward transmission band control Msgs are sent and received respectively by using access control packets (refer to FIG. 3(b)).

Therefore, in the present embodiment, the control Msg transmission path control unit 115 constitutes an upward transmission band control information transmission path control unit. The detailed selection processing of a transmission path for the first and second upward transmission band control Msgs by this control Msg transmission path control unit 115 is described hereinafter.

In addition to the above described functions, the switching server 100 according to the present embodiment has a function of checking the order of IP packets sent and received between the MN300 and the IP phone terminal 40 through the wireless IP networks 10A and 10B by using a sequence number (SN) of RTP (real-time transport protocol) included in VoIP packet. Further, the switching server 100 has a function of obtaining statistical information (e.g. packet loss, throughput, and underrun count and overrun count of jitter-buffer) of IP packets to be relayed and of sending the obtained information to the MN300.

Further, the switching server 100 has a function of verifying a home IP address AH included in a IP packet sent by the IP phone terminal 40 with respect to a home IP address registered in a home agent (not shown) that is accessible through the Internet 20. Through this verification, it is possible to determine which telecommunication carrier allocates the home IP address AH to the MN300.

[MN300]

The MN300, in the same manner as the switching server 100, can perform communication by using the wireless IP networks 10A and 10B simultaneously. Explanation of the function block similar to that of the switching server 100 is occasionally omitted hereinafter.

As shown in FIG. 2, the MN300 includes a reception interface unit (I/F A) 301Rx, a reception interface unit (I/F B) 303Rx, a transmission interface unit (I/F A) 301Tx, a transmission interface unit (I/F B) 303Tx, an application processing unit 305, a received packet monitoring unit 307, a transmission band calculating unit 309, a transmission band control Msg analyzing unit 311, a packet transmission path control unit 313, a control Msg transmission path control unit 315 and a transmission path selecting unit 317.

The reception interface unit 301Rx and the transmission interface unit 301Tx perform wireless communication of the wireless communication method (HRPD of the 3GPP2 standard) employed by the wireless IP network 10A. In the present embodiment, IP packets (VoIP packets) are sent and received to and from the IP phone terminal 40 at a predetermined cycle (e.g. 20 ms) through the wireless IP network 10A. These reception interface unit 301Rx and transmission interface unit 301Tx are embedded in the MN300 or are configured as a wireless communication card.

The reception interface unit 303Rx and the transmission interface unit 303Tx perform wireless communication that is complies with the wireless communication method (mobile WiMAX) employed by the wireless IP network 10B and, in the same manner, are embedded in the MN300 or are configured as a wireless communication card.

Further, the reception interface unit 301Rx and the transmission interface unit 301Tx, and the reception interface unit 303Rx and the transmission interface unit 303Tx send and receive IP packets based on the care-of IP addresses A1 and A2 allocated to the MN300 in the wireless IP networks 10A and 10B.

The received packet monitoring unit 307 has a jitter-buffer for absorbing the IP packets received by the reception interface units 301Rx and 303Rx and supplies the received IP packets to the application processing unit 305. Further, the received packet monitoring unit 307 supplies the IP packets received by the reception interface units 301Rx and 303Rx to the transmission band calculating unit 309, while receiving the above described first and second upward transmission band control Msgs from the switching server 100 and supplying them to the transmission band control Msg analyzing unit 311.

The application processing unit 305 processes the received IP packets from the received packet monitoring unit 307 according to the application, while generating IP packets (e.g. VoIP packets) based on the application and sending them to the transmission path selecting unit 317. Further, the application processing unit 305 stores a home IP address AH of the MN300 that is associated with care-of IP addresses A1 and A2.

The transmission band calculating unit 309, in the same manner as the transmission band calculating unit 109 of the switching server 100, calculates at a predetermined cycle (e.g. 1000 ms) a first downward transmission band of the IP packets to be sent by the switching server 100 to the wireless IP network 10A based on the received packets from the received packet monitoring unit 307 through, the wireless IP network 10A. In the case where the calculated present first downward transmission band is narrower than the first downward transmission band calculated most recently, the transmission band calculating unit 309 supplies the first downward transmission band calculated at the present time to the control Msg transmission path control unit 315, and supplies it to the transmission path selecting unit 317 as a first downward transmission band control Msg indicating that the transmission band has become narrow as well.

In addition, in the same manner, the transmission band calculating unit 309 calculates at a predetermined cycle a second downward transmission band of the IF packets to be sent by the switching server 100 to the wireless IP network 10B based on the received packets from the received packet monitoring unit 307 through the wireless IP network 10B. Further, in the case where the second downward transmission band calculated at the present time is narrower than the second downward transmission band calculated most recently, the transmission band calculating unit 309 supplies a second downward transmission band calculated at the present time to the control Msg transmission path control unit 315, and supplies it to the transmission path selecting unit 317 as a second downward transmission band control Msg indicating that a transmission band has become narrow as well.

Therefore, in the present embodiment, the transmission band calculating unit 309 constitutes a first downward transmission band control information generating unit and a second downward transmission band control information generating unit.

Further, when the transmission band calculating unit 309 calculates a transmission band based on the received packets, as in the case of the above described transmission band calculating unit 109 of the switching server 100, for example, the number of packets received in the monitoring period Tchk is counted with respect to each path of the wireless IP networks 10A and 10B, then the transmission band is calculated based on the number of received packets (reception rate).

The transmission band control Msg analyzing unit 311 analyzes a first upward transmission band of the IP packets to be sent by the MN300 to the wireless IP network 10A and a second upward transmission band of the IP packets to be sent by the MN300 to the wireless IP network 10B based on the above described first and second upward transmission band control Msgs from the switching server 100 received by the received packet monitoring unit 307. The transmission band control Msg analyzing unit 311 supplies the analysis results to the packet transmission path control unit 313 and the control Msg transmission path control unit 315.

The packet transmission path control unit 313 controls the transmission path selecting unit 317 based on the first and second upward transmission bands analyzed by the transmission band control Msg analyzing unit 311.

Thus the transmission path selecting unit 317 distributes the VoIP packets from the application processing unit 305 to the transmission interface units 301Tx and 303Tx according to the first and second upward transmission bands analyzed by the transmission band control Msg analyzing unit 311 and sends the VoIP packets to the switching server 100 through the wireless IP networks 10A and 10B.

More specifically, the transmission path selecting unit 317 adds a care of IP address A1 to the IP packet that includes a home IP address AH from the application processing unit 305 based on the information of the first upward transmission band received from the transmission band control Msg analyzing unit 311 and sends the IP packet having the added care-of IP address A1 from the transmission interface unit 301Tx to the wireless IP network 10A.

In addition, the transmission path selecting unit 317 adds a care of IP address A2 to the IP packet that includes a home IP address AH from the application processing unit 305 based on the information of the second upward transmission band received from the transmission band control Msg analyzing unit 311 and sends the IP packet having the added IP address A2 from the transmission interface unit 303Tx to the wireless IP network 10B.

The control Msg transmission path control unit 315 controls the band statuses of the wireless IP networks 10A and 10B based on the first and second downward transmission bands supplied by the transmission band calculating unit 309 and the first and second upward transmission bands analyzed by the transmission band control Msg analyzing unit 311. Then the control Msg transmission path control unit 315 controls the transmission path selecting unit 317 based on those band statuses and selects a transmission path for sending the switching server 100 the first and second downward transmission band control Msgs generated by the transmission band calculating unit 309. In addition, these first and second downward transmission band control Msgs are sent and received respectively by using access control packets (refer to FIG. 3(b)) as in the case of the above described first and second upward transmission band control Msgs.

Therefore, in the present embodiment, the control Msg transmission path control unit 315 constitutes a downward transmission band control information transmission path control unit. The detailed selection processing of a transmission path for the first and second downward transmission band control Msgs by this control Msg transmission path control unit 315 is described hereinafter.

In addition, as in the case of the switching server 100, the MN300 according to the present embodiment has also a function of checking the order of IP packets sent and received between the MN300 and the IP phone terminal 40 using a sequence number (SN) of RTP included in VoIP packet.

[Selection Processing of Transmission Path for Transmission Band Control Msg]

Next, the above mentioned selection processing of a transmission path for first and second upward transmission band control Msgs by using the control Msg transmission path control unit 115 of the switching server 100, and selection processing of a transmission path for first and second downward transmission band control Msgs by using the control Msg transmission path control unit 315 of the MN300 are described. However, since the transmission path selection processing of these transmission band control Msgs are the same for both on the switching server 100 and the MN300 sides, only the representative case where the switching server 100 sends a transmission band control Msg to the MN300 is described herein.

Figure 4:
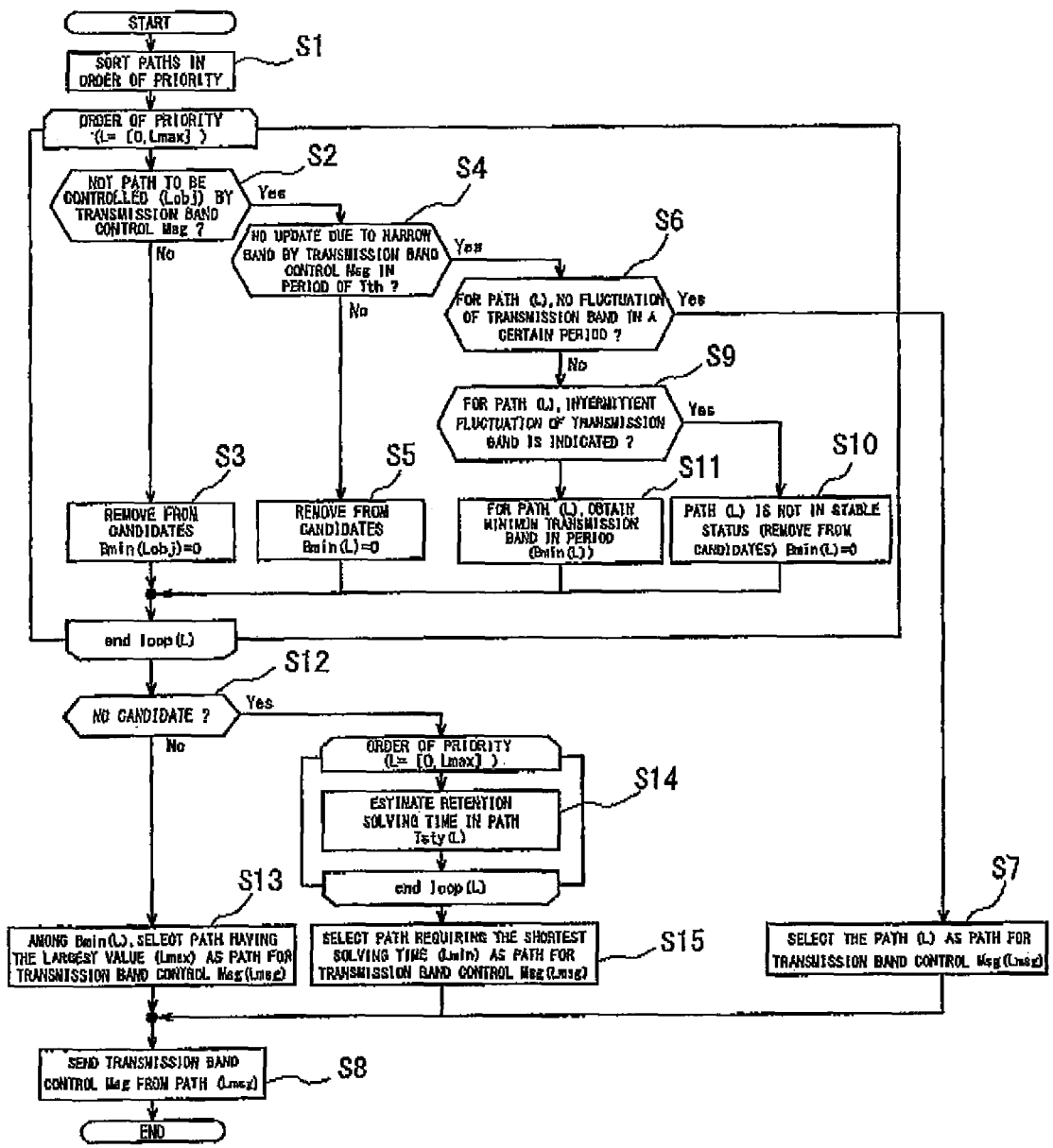
FIG. 4 is a flow chart illustrating a path selection processing for a transmission band control Msg according to the embodiment shown in FIG. 1.

FIG. 4 shows a flow chart illustrating a path selection processing of a transmission band control Msg. At first, the priority is set with respect to the wireless communication paths being used. Then the paths are sorted in order of the priority, and the band status is verified (step S1).

In order to verify the path, at first, whether or not the path to be verified (L) is a path to be controlled (Lobj) by the transmission band control Msg is determined (step S2). If it is a path to be controlled, it is removed from the transmission path candidates (step S3) and the next path is verified. On the other hand, if it is not a path to be controlled, whether or not the transmission band has been updated due to narrowing of band during a predetermined period of time up until the present time (Tth: e.g. 1000 ms) is determined (step S4). If it has been updated, the path is removed from the transmission path candidates (step S5) and the next path is verified. In this case, the determination of step S4 can be conducted, for example, based on the record of transmission band control Msgs for a corresponding path.

In step S4, if the transmission band has not been updated due to narrow band during the predetermined period of time (Tth) up until the present time, then, whether or not the transmission band indicated by the transmission band control Msgs sent from the MN300 with respect to the path has fluctuated during a certain period of time (e.g. a few seconds) up until the present time is determined (step S6).

In this case, if there was no fluctuation, since the allowable band of the path is equal to or more than the transmission band at least during the most recent certain period of time, without conducting verification of the following path, the transmission path selecting unit 117 is controlled to select this path as a transmission path (Lmsg) for the transmission band control Msg (step S7). Thus, the transmission band control Msg is sent from the transmission path (Lmsg) (step S8). Then the process is finished.

On the other hand, in step S6, if the transmission bands indicated by the transmission band control Msgs from the MN300 have been fluctuated, whether or not intermittent fluctuation of transmission band was indicated is determined (step S9). As a result of that, when sudden fluctuation was indicated, there is a possibility that packet retention in the path has occurred. Therefore the path is removed from the transmission path candidates (step S10) and the next path is verified. On the other hand, when it is not intermittent fluctuations, the minimum transmission band (Bmin (L)) of the path during the above mentioned certain period of time is obtained (step S11) as a transmission path candidate, and the next path is verified.

When no path (Lmsg) can be obtained for sending a transmission band control Msg as a result of the verification with respect to all the paths, next, the presence of a transmission path candidate is determined (step S12). If there are some candidates as a result of that, by comparing the lowest transmission bands (Bmin(L)) of the path candidates, the path having the highest value is selected as a transmission path (Lmsg) for a transmission band control Msg (step S13). Then the transmission band control Msg is sent from the transmission path (Lmgs) in step S8. Thus the process is finished.

On the other hand, in the case where no transmission path candidate can be obtained in step S12, the time (Tsty(L)) required for solving packet retention in a path is estimated with respect to all paths according to the above mentioned priority order (step S14). Then the path that requires the shortest solving time (Tsty(L)) is selected as a transmission path (Lmsg) for a transmission band control Msg (step S15). In step S8, the process is finished by sending the transmission band control Msg from the transmission path (Lmsg).

Figure 5:
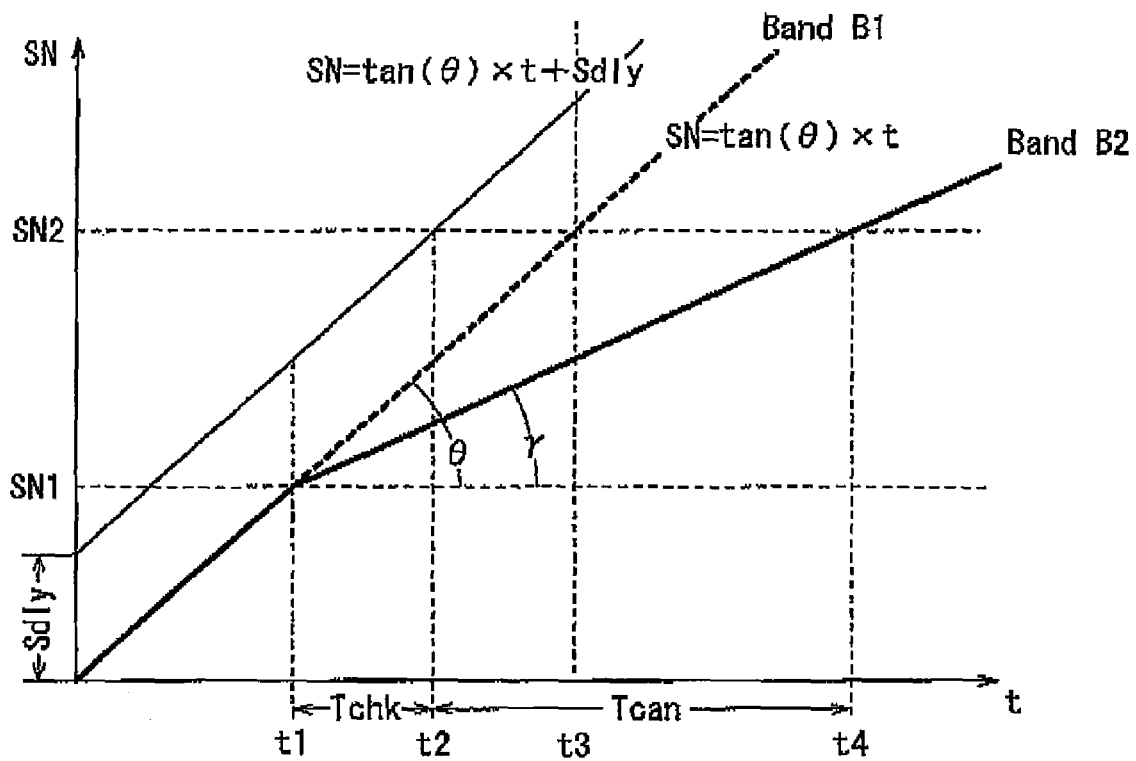
FIG. 5 is a diagram illustrating a retention time of packets due to fluctuations of transmission band.

With respect to the solving time (Tsty(L)) of retention that is determined in step S14, for example, it is estimated based on the fluctuation of transmission band indicated by a transmission band control Msg from the MN300. In other words, as shown in FIG. 5, the relationship between the receiving time of packet and the sequence number (SN) before the band has become narrow is represented by the line as follows;

$$SN=\tan(\theta) \times t$$

In this case, θ indicates gradient of the line and t indicates time. In addition, the relationship between the sending time of packet and the SN on a sender side is represented by the line as follows;

$$SN=\tan(\theta) \times t + Sdly$$

In this case, Sdly indicates difference of SN caused by a delay in the path, which is a value depending on the characteristics of the path.

In FIG. 5, assume that the band of the path has fluctuated from the band B1 to the band B2 at time t1. In this case, when a transmission band is calculated based on the number of received packets during the monitoring period Tchk, band fluctuation is detected at time t2, which may delay at most Tchk. At this point, assuming that an IP packet is sent by SN2 on the sender side, a period of time (Tcan), during which SN2 is received by the band B2, is required to solve the packet retention in the path.

In this case, SN2 based on the transmission characteristics is represented as follows;

$$SN2=\tan(\theta) \times Tchk + Sdly + SN1.$$

On the other hand, SN2 based on the band B2 is represented as follows;

$$SN2=\tan(\gamma) \times (Tchk+Tcan) + SN1.$$

Therefore, based on time t2, time (Tcan) required to solve the retention is represented as follows;

$Tcan=[\{\tan(\theta) \times Tchk + Sdly\}/\tan(\gamma)] - Tchk.$

Therefore, assuming that the present time is t3, the remaining solving time (Tsty) is represented as follows;

$Tsty = Tcan + t2 - t3.$

This solving time (Tsty) is calculated with respect to each path according to the priority order and a path that requires the shortest solving time is selected. Further, when a transmission band is updated for more than one time according to fluctuations of an allowable band of a path, a solving time is estimated by multiplexing for the number of updates depending on the detection timing.

Further, in the present embodiment, in the case where, after a transmission band control Msg is sent, a transmission band control Msg to the path that has sent the transmission band control Msg is received, it is highly possible that the transmission band control Msg that was sent previously remains in the path without reaching the corresponding party. Therefore retransmission of the transmission band control Msg is tried again using another path.

Figure 6:
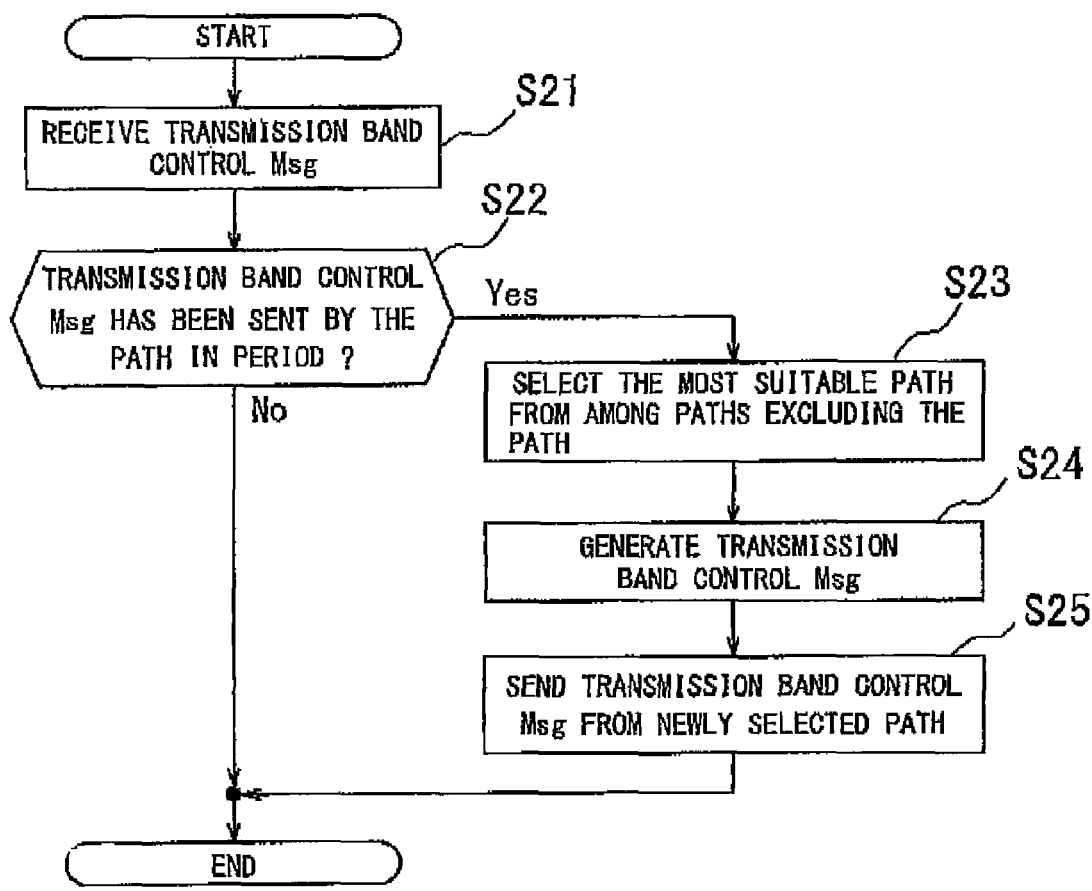
FIG. 6 is a flow chart illustrating a retransmission processing for a transmission band control Msg according to the embodiment shown in FIG. 1.

FIG. 6 is a flow chart illustrating this retransmission process of transmission band control Msg. At first, when a transmission band control Msg from the corresponding party (in this case, MN300) is received (step S21), whether or not a transmission band control Msg has been sent from a path whose transmission band is to be controlled by the received transmission band control Msg within a predetermined period of time (e.g. 1000 ms) is determined (step S22). If a Msg has been sent, the most suitable path is selected from among the paths excluding the transmission path according to FIG. 4 (step S23), while generating a transmission band control Msg again (step S24) and sending the regenerated transmission band control Msg from the newly selected path (step S25).

[Operation of Communication System]

Figure 7:
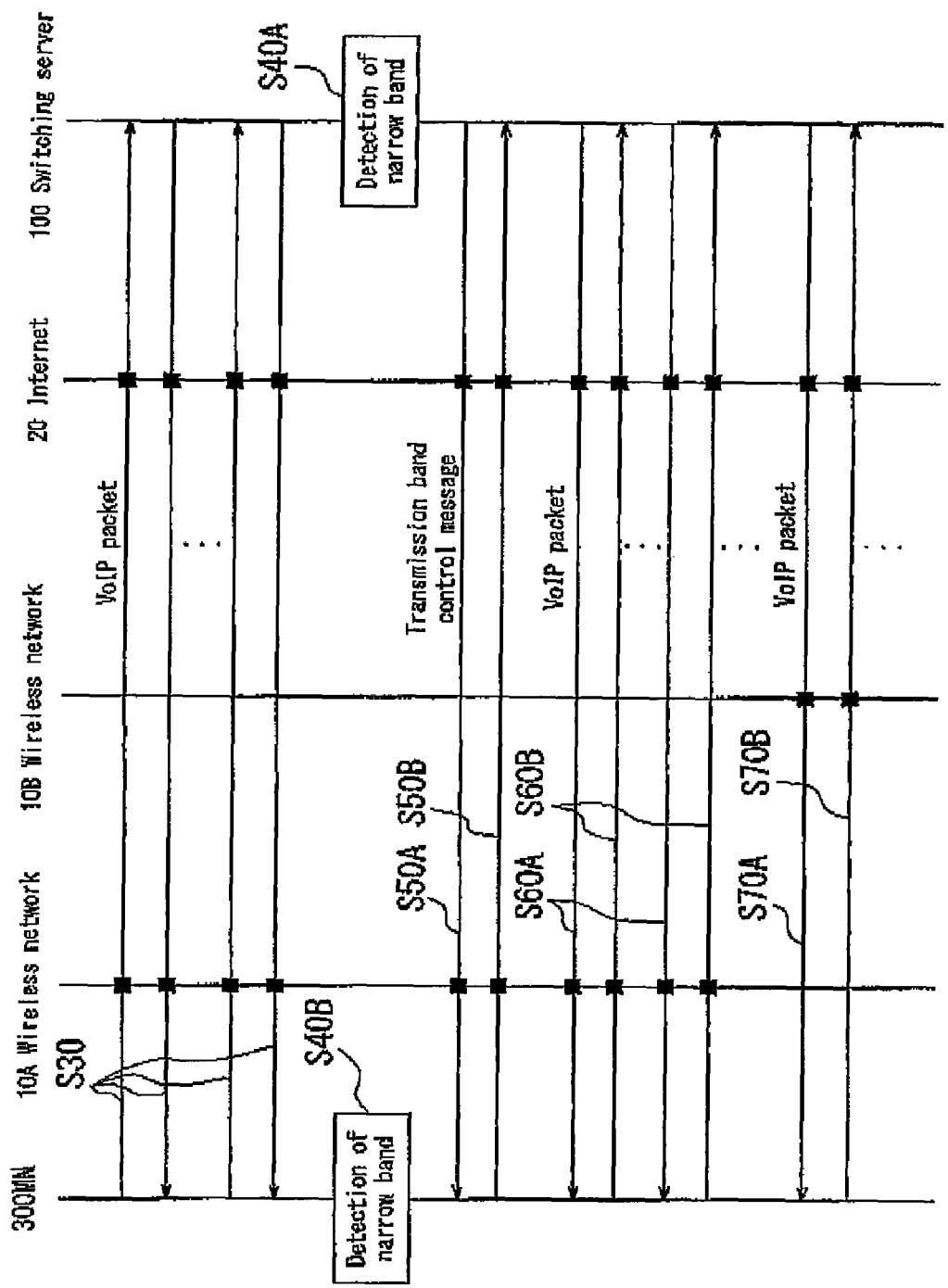
FIG. 7 is a communication sequence diagram illustrating an example of communication performing between the switching server and the MN according to the embodiment shown in FIG. 1.

Next, an example of operation of the above mentioned communication system is described below with reference to FIG. 7. FIG. 7 is a communication sequence diagram performed between the switching server 100 and the MN300. As shown in FIG. 7, in step S30, the switching server 100 and the MN300 send and receive VoIP packets through the wireless IP network 10A (master path) and the Internet 20. Further, the VoIP packets are sent and received along with voice communication between the MN300 and the IP phone terminal 40 (refer to FIG. 1).

Figure 3:
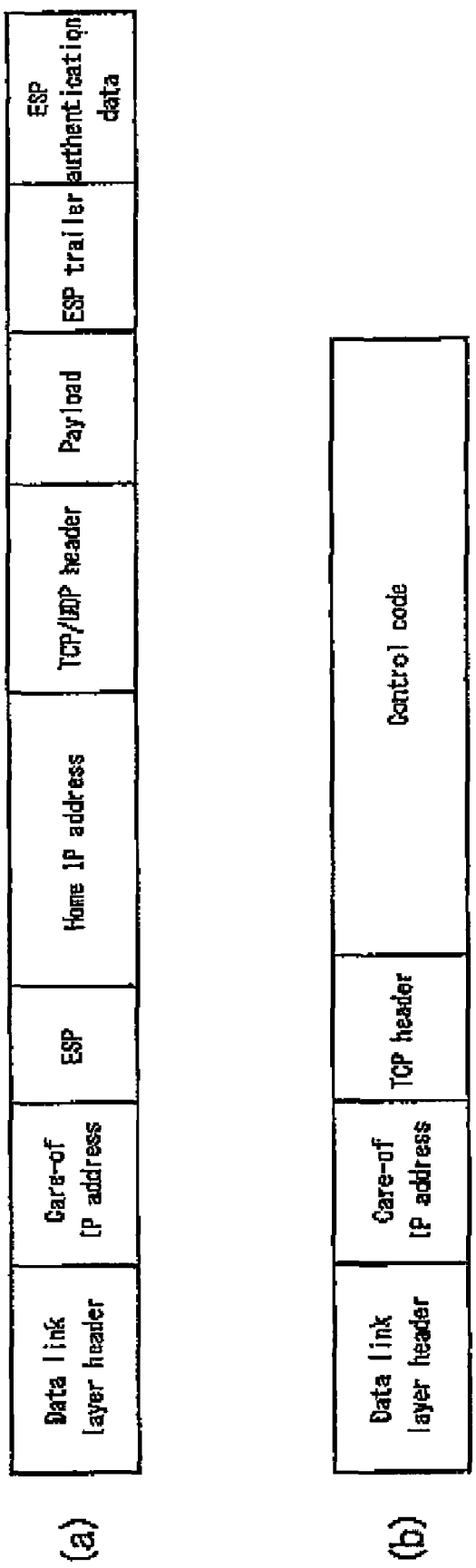
FIG. 3 is a configuration diagram of IP packet according to the embodiment shown in FIG. 1.

More specifically, the MN300 sends an IP packet, in which a payload including an IP address allocated to the IP phone terminal 40 and a home IP address AH are encapsulated, and a care-of IP address A1 is used as a sender address (see FIG. 3 (a)).

In addition, the switching server 100 sends an IP packet, in which a VoIP packet sent by the IP phone terminal 40 is encapsulated, and a care-of IP address A1 is set as a sender address.

In addition, the "black square" marks shown in the figure are marked on the network through which the VoIP packets are routed (the same will be applied below). In step S30, all VoIP packets are routed through the wireless IP network 10A (master path) and the Internet 20.

In this condition, in the switching server 100, the transmission band calculating unit 109 calculates an upward transmission band of the wireless IP network 10A as 100%. In the same manner, in the MN300, the transmission band calculating unit 309 calculates a downward transmission band of the wireless IP network 10A as 100%.

After that, when the switching server 100 detects that the upward transmission band of the wireless IP network 10A has become narrow in step S40A, a transmission band control Msg (a first upward transmission band control Msg) indicating so is generated and sent to the MN300 through the wireless IP network 10A (step S50A).

In the same manner, when the MN300 detects that the downward transmission band of the wireless IP network 10A has become narrow in step S40B, a transmission band control Msg (a first downward transmission band control Msg) indicating so is generated and sent to the switching server 100 through the wireless IP network 10A (step S50B).

In step S60A, the switching server 100 controls the transmission band of the VoIP packets to be sent to the wireless IP network 10A based on the first downward transmission band control Msg received from the MN300 and sends the VoIP packets to the wireless IP network 10A.

In step S60B, the MN300 controls the transmission band of the VoIP packets to be sent to the wireless IP network 10A based on the first upward transmission band control Msg received from the switching server 100 and sends the VoIP packets to the wireless IP network 10A.

In step S70A, the switching server 100 calculates the transmission band of the VoIP packets to be sent to the wireless IP network 10B, which is a slave path, based on the first downward transmission band control Msg received from the MN300 and sends the VoIP packets to the wireless IP network 1013 according to the calculated transmission band.

In step S70B, the MN300 calculates the transmission band of the VoIP packets to be sent to the wireless IP network 10B, which is a slave path, based on the first upward transmission band control Msg received from the switching server 100 and sends the VoIP packets to the wireless IP network 10B according to the calculated transmission band.

The VoIP packets are routed through the wireless IP network 10B and the Internet 20 in these steps S70A and S70B. In other words, insufficient band of the wireless IP network 10A is compensated with the wireless IP network 10B.

After that, for the wireless IP network 10B, the switching server 100 detects if the upward transmission band of the wireless IP network 10B has become narrow based on the received packets, then when it is detected that the band has become narrow, generates a second upward transmission band control Msg indicating so and sends the second upward transmission band control Msg from the most suitable transmission path to the MN300 according to the flow charts shown in FIGS. 4 and 6.

In the same manner, for the wireless IP network 10B, the MN300 detects if the downward transmission band of the wireless IP network 10B has become narrow based on the received packets, then when it is detected that the band has become narrow, generates a second downward transmission band control Msg indicating so and sends the second downward transmission band control Msg from the most suitable transmission path to the switching serer 100 according to the flow charts shown in FIGS. 4 and 6.

In addition, for the wireless IP network 10A, which is a master path, the switching server 100 detects if the upward transmission band of the wireless IP network 10A has become narrow based on the received packets, then when it is detected that the band has become narrow, generates a first upward transmission band control Msg indicating so, and in the same manner, sends the first upward transmission band control Msg from the most suitable transmission path to the MN300 according to the flow charts shown in FIGS. 4 and 6.

In the same manner, for the wireless IP network 10A, the MN300 detects if the downward transmission band of the wireless IP network 10A has become narrow based on the received packets, then when it is detected that the band has become narrow, generates a first downward transmission band control Msg indicating so, and in the same manner, sends the first downward transmission band control Msg from the most suitable transmission path to the switching server 100 according to the flow charts shown in FIGS. 4 and 6.

Thus, the switching server 100 distributes the VoIP packets received from the IP phone terminal 40 to the wireless IP networks 10A and 10B based on the first or second downward transmission band control Msg received from the MN300 and sends them thereto. In addition, the MN300 distributes the VoIP packets to the wireless IP networks 10A and 10B based on the first or second upward transmission band control Msg received from the switching server 100 and sends them thereto.

As mentioned above, according to the switching server 100 of the present embodiment, the band statuses of the wireless IP networks 10A and 10B are monitored based on the packets received respectively through the wireless IP networks 10A and 10B and the first and second downward transmission band control Msgs indicating respectively that the downward transmission band of each of the wireless IP networks 10A and 10B has become narrow. Then, based on the monitoring results, the most suitable path for sending the first and second upward transmission band control Msgs indicating respectively that the upward transmission band of each of the wireless IP networks 10A and 10B has become narrow is selected. Thus, first and second upward transmission band control Msgs can consistently be sent to the MN300 with the minimum arrival time and packet retention in a wireless communication path can be minimized. Therefore, the number of packets to be discarded without being reproduced due to a delay in arrival time caused by fluctuation of allowable band can be reduced effectively. Thus VoIP packets can accurately be sent to the MN300 while compensating for insufficient band of the wireless IP network 10A with the wireless IP network 10B.

In the same manner, according to the MN300 of the present embodiment, the band statuses of the wireless IP networks 10A and 10B are monitored based on the packets received respectively through the wireless IP networks 10A and 10B and the first and second upward transmission band control Msgs indicating respectively that the upward transmission band of each of the wireless IP networks 10A and 10B has become narrow. Then, based on the monitoring results, the most suitable path for sending the first and second downward transmission band control Msgs indicating respectively that the downward transmission band of each of the wireless IP networks 10A and 10B has become narrow is selected. Thus, first and second upward transmission band control Msgs can always be sent to the switching server 100 with the minimum arrival time and packet retention in a wireless communication path can be minimized. Therefore, the number of packets to be discarded without being reproduced due to a delay in arrival time caused by fluctuation of allowable band can be reduced effectively. Thus VoIP packets can accurately be sent to the switching server 100 while compensating for insufficient band of the wireless IP network 10A with the wireless IP network 10B.

In addition, in the switching server 100 and the MN300, since a transmission band control Msg indicating that a transmission band has become narrow is generated with respect to each of upward and downward directions of the wireless IP networks 10A and 10B, a transmission band can be controlled by detecting band fluctuations in real time in accordance with the communication method of the wireless IP networks 10A and 10B. Therefore, the number of packets to be discarded without being reproduced due to a delay in arrival time caused by fluctuation of allowable band can be reduced effectively in a real-time application such as VoIP.

In addition, it should be noted that the present invention is not limited to the above described embodiment, but many modifications and changes are available. For example, the communication system 1 includes the wireless IP networks 10A and 10B. However, more wireless IP networks may be used. In addition, in the above mentioned embodiment, although insufficient transmission band is compensated both in upward and downward directions, it can be either upward or downward direction. Further, if there is any available unused wireless communication path, it can be used as a transmission path for a transmission band control Msg.

Further, in the above mentioned embodiment, control of transmission band based on a transmission band control Msg is not limited to a corresponding wireless path, but control may be conducted simultaneously to another wireless path to allow mutual compensation. In addition, if still another wireless path is included, the wireless path can be used to compensate for the narrowed amount. For example, in the switching server 100, when the transmission band of the packets to be sent to the wireless IP network 10B is narrowed based on a second downward transmission band control Msg from the MN300, it is possible to control the transmission band so that the band of the packets to be sent to the wireless IP network 10A is increased to compensate for the narrowed amount, or to control so that the narrowed amount can be compensated with the still another wireless path.

The invention claimed is:

1. A communication control apparatus capable of using a plurality of different wireless communication paths for a wireless communication apparatus and controlling communication between the wireless communication apparatus and a corresponding party by compensating for insufficient band of one wireless communication path with respect to a band required by a real-time application in use with another wireless communication path, comprising:

a first upward transmission band control information generating unit for generating first upward transmission band control information indicating that a transmission band of packet to be sent by the wireless communication apparatus to the one wireless communication path has become narrow based on packet received through the one wireless communication path;

a second upward transmission band control information generating unit for generating second upward transmission band control information indicating that a transmission band of packet to be sent by the wireless communication apparatus to the another wireless communication path has become narrow based on packet received through the another wireless communication path; and an upward transmission band control information transmission path control unit for selecting a most suitable transmission path for sending the first upward transmission band control information or the second upward transmission band control information to the wireless communication apparatus based on band statuses of the plurality of wireless communication paths.

2. A communication control apparatus of claim 1, wherein the upward transmission band control information transmission path control unit selects, from the one wireless communication path and the another wireless communication path, a wireless communication path that has not sent the first or second upward transmission band control information for a certain period of time as the most suitable transmission path.

3. A communication control apparatus of claim 1, wherein the upward transmission band control information transmission path control unit selects, from the one wireless communication path and the another wireless communication path, a wireless communication path that has the largest allowable band as the most suitable transmission path for the first or second upward transmission band control information.

4. A communication control apparatus of claim 2, wherein the upward transmission band control information transmission path control unit selects, from the one wireless communication path and the another wireless communication path, a wireless communication path that has the largest allowable band as the most suitable transmission path for the first or second upward transmission band control information.

5. A communication control apparatus of claim 1, wherein the upward transmission band control information transmission path control unit selects, from the one wireless communication path and the another wireless communication path, a wireless communication path that requires the shortest retention solving time of packet sent from the wireless communication apparatus as the most suitable transmission path for the first or second upward transmission band control information.

6. A wireless communication apparatus capable of using a plurality of different wireless communication paths for a communication control apparatus and performing wireless communication with a corresponding party through the communication control apparatus by compensating for insufficient band of one wireless communication path with respect to a band required by a real-time application in use with another wireless communication path, comprising;
 a first downward transmission band control information generating unit for generating first downward transmission band control information indicating that a transmission band of packet to be sent by the communication control apparatus to the one wireless communication path has become narrow based on packet received through the one wireless communication path;
 a second downward transmission band control information generating unit for generating second downward transmission band control information indicating that a transmission band of packet to be sent by the communication control apparatus to the another wireless communication path has become narrow based on packet received through the another wireless communication path; and
 a downward transmission band control information transmission path control unit for selecting a most suitable transmission path for sending the first downward transmission band control information or the second downward transmission band control information to the communication control apparatus based on band statuses of the plurality of wireless communication paths.

7. A wireless communication apparatus of claim 6, wherein the downward transmission band control information transmission path control unit selects, from the one wireless communication path and the another wireless communication path, a wireless communication path that has not sent the first or second downward transmission band control information for a certain period of time as the most suitable transmission path.

8. A wireless communication apparatus of claim 6, wherein the downward transmission band control information transmission path control unit selects, from the one wireless communication path and the another wireless communication path, a wireless communication path that has the largest allowable band as the most suitable transmission path for the first or second downward transmission band control information.

9. A wireless communication apparatus of claim 7, wherein the downward transmission band control information transmission path control unit selects, from the one wireless communication path and the another wireless communication path, a wireless communication path that has the largest allowable band as the most suitable transmission path for the first or second downward transmission band control information.

10. A wireless communication apparatus of claim 6, wherein the downward transmission band control information transmission path control unit selects, from the one wireless communication path and the another wireless communication path, a wireless communication path that requires the shortest retention solving time of packet sent from the communication control apparatus as the most suitable transmission path for the first or second downward transmission band control information.

11. A communication control method capable of using a plurality of different wireless communication paths for a wireless communication apparatus and controlling communication between the wireless communication apparatus and a corresponding party by compensating for insufficient band of one wireless communication path with respect to a band required by a real-time application in use with another wireless communication path, comprising the steps of:
 generating first upward transmission band control information indicating that a transmission band of packet to be sent by the wireless communication apparatus to the one wireless communication path has become narrow based on packet received through the one wireless communication path;
 generating second upward transmission band control information indicating that a transmission band of packet to be sent by the wireless communication apparatus to the another wireless communication path has become narrow based on packet received through the another wireless communication path; and
 selecting a most suitable transmission path for sending the first or second upward transmission band control information to the wireless communication apparatus based on band statuses of the plurality of wireless communication paths.

12. A wireless communication method capable of using a plurality of different wireless communication paths with a communication control apparatus and performing wireless communication for a corresponding party through the communication control apparatus by compensating for insufficient band of one wireless communication path with respect to a band required by a real-time application in use with another wireless communication path, comprising the steps of:
 generating first downward transmission band control information indicating that a transmission band of packet to be sent by the communication control apparatus to the one wireless communication path has become narrow based on packet received through the one wireless communication path;
 generating second downward transmission band control information indicating that a transmission band of packet to be sent by the communication control apparatus to the another wireless communication path has become narrow based on packet received through the another wireless communication path; and
 selecting a most suitable transmission path for sending the first or second downward transmission band control information to the communication control apparatus based on band statuses of the plurality of wireless communication paths.

* * * * *